(12) United States Patent
Lin

(10) Patent No.: US 10,967,288 B2
(45) Date of Patent: Apr. 6, 2021

(54) INSERT-AND-TWIST BUILDING BLOCK STRUCTURE

(71) Applicant: Fang Yi Lin, Taichung (TW)

(72) Inventor: Fang Yi Lin, Taichung (TW)

( * ) Notice: Subject to any disclaimer, the term of this patent is extended or adjusted under 35 U.S.C. 154(b) by 0 days.

(21) Appl. No.: 16/822,028

(22) Filed: Mar. 18, 2020

(65) Prior Publication Data

US 2020/0306658 A1 Oct. 1, 2020

(30) Foreign Application Priority Data

Mar. 28, 2019 (TW) ................. 108110925

(51) Int. Cl.

| A63H 33/04 | (2006.01) |
|---|---|
| F16B 21/02 | (2006.01) |
| A63H 33/08 | (2006.01) |
| A63H 33/10 | (2006.01) |
| F16B 5/10 | (2006.01) |
| F16B 5/00 | (2006.01) |
| A63H 33/06 | (2006.01) |

(52) U.S. Cl.
CPC ......... *A63H 33/084* (2013.01); *A63H 33/067* (2013.01); *A63H 33/086* (2013.01); *A63H 33/088* (2013.01); *A63H 33/106* (2013.01); *F16B 5/0092* (2013.01); *F16B 5/10* (2013.01); *F16B 21/02* (2013.01); *Y10T 403/5733* (2015.01)

(58) Field of Classification Search
CPC .......... F16B 5/0092; F16B 5/10; F16B 21/02; F16B 2200/10; Y10T 403/5733; Y10T 403/7005; A63H 33/067; A63H 33/106
See application file for complete search history.

(56) References Cited

U.S. PATENT DOCUMENTS

| 5,261,758 A | * | 11/1993 | Vranish | ................. B23B 31/113 403/13 |
|---|---|---|---|---|
| 6,880,224 B2 | * | 4/2005 | Colarusso | ................. B21C 5/00 29/456 |
| 8,439,593 B2 | * | 5/2013 | Slater | ..................... F16B 21/04 403/361 |

(Continued)

FOREIGN PATENT DOCUMENTS

| TW | M446582 | 2/2013 |
|---|---|---|
| TW | I538722 | 6/2016 |

*Primary Examiner* — John A Ricci
(74) *Attorney, Agent, or Firm* — Leong C. Lei

(57) ABSTRACT

An insert-and-twist building block structure includes a connection bar and a connection terminal unit. The connection bar has an end from which a combination projection section extends and has a conic shape. The combination projection section has an external circumferential surface formed with a bead ring including multiple raised beads intermittently arranged in a ring configuration. The connection terminal unit includes a connection terminal having an end inward recessed to form a combination cavity in a conic shape. The combination cavity has an internal circumferential surface formed with a groove ring including multiple recessed grooves intermittently arranged in a ring configuration. The recessed grooves each a middle portion forming a deep trough section and two ends each forming a shallow trough section, and a depth is decreased from the deep trough section toward the shallow trough sections.

28 Claims, 19 Drawing Sheets

(56) References Cited

U.S. PATENT DOCUMENTS

| | | | | |
|---|---|---|---|---|
| 9,010,059 B2* | 4/2015 | Lin | ...................... | A63H 33/106 52/585.1 |
| 9,695,855 B2* | 7/2017 | Lin | ...................... | F16B 5/0275 |
| 2013/0084131 A1* | 4/2013 | Langenfeld | ............. | F16L 15/06 403/343 |
| 2019/0266920 A1* | 8/2019 | Kim | ..................... | A63H 33/106 |

* cited by examiner

INSERT-AND-TWIST BUILDING BLOCK STRUCTURE

TECHNICAL FIELD OF THE INVENTION

The present invention relates to building blocks, and more particularly to an insert-and-twist building block structure.

DESCRIPTION OF THE PRIOR ART

Building blocks are a toy that helps train coordination among brain, hands, and eyes. The ways of playing and combination are versatile and this makes it particularly suitable to training for development of creativity.

There are various types of building blocks available in the market, including those that are blocks stackable according to different geometric shapes and those that are formed with recesses and projection on each block for connection through fitting of those parts. However, such known building blocks, after being combined, are often too tight to separate from each other by young children, particularly those aged under six.

SUMMARY OF THE INVENTION

In view of the above, improvement of the prior art must be made in respect of the problem of the building blocks being too tight to be separated for young children after being combined together.

An objective of the present invention is to provide an insert-and-twist building block structure, which makes separation after combination easy and effort-saving.

The present invention provides an insert-and-twist building block structure, which generally comprises: at least one connection bar, the connection bar having at least one end from which a combination projection section extending outward in an axial direction, the combination projection section having an outside diameter that is increased from a distal end toward a proximal end so as to form a conic shape, the combination projection section having an external circumferential surface that is formed with at least one bead ring, the bead ring including multiple raised beads that are arranged in a ring configuration in an intermittent form; and a connection terminal unit, which comprises at least one connection terminal, the connection terminal having at least one end that is recessed inward in an axial direction to form a combination cavity, the combination cavity having an inside diameter that is decreased from an outer end toward an inner end so as to form a conic shape, the combination cavity having an internal circumferential surface that is formed with at least one groove ring, the groove ring including multiple recessed grooves that are arranged in a ring configuration in an intermittent form, the recessed grooves being extended in a radial direction of the internal circumferential surface of the combination cavity and being each formed as an elongate strip, each of the recessed grooves has a middle portion that forms a deep trough section and two end portions each forming a shallow trough section, the recessed grooves each having a depth that is decreased from the deep trough section toward the shallow trough section.

The combination projection section of the connection bar is insertable into the combination cavity of the connection terminal to have the raised beads received in the deep trough sections of the recessed grooves to achieve combination of the connection bar and the connection terminal; and the connection bar is rotatable to have the raised beads moved in a direction from the deep trough sections of the recessed grooves toward the shallow trough sections, so as to separate the connection bar and the connection terminal from each other, whereby an effect of saving effort and easy operation can be achieved.

DETAILED DESCRIPTION OF THE PREFERRED EMBODIMENT

Figure 1:
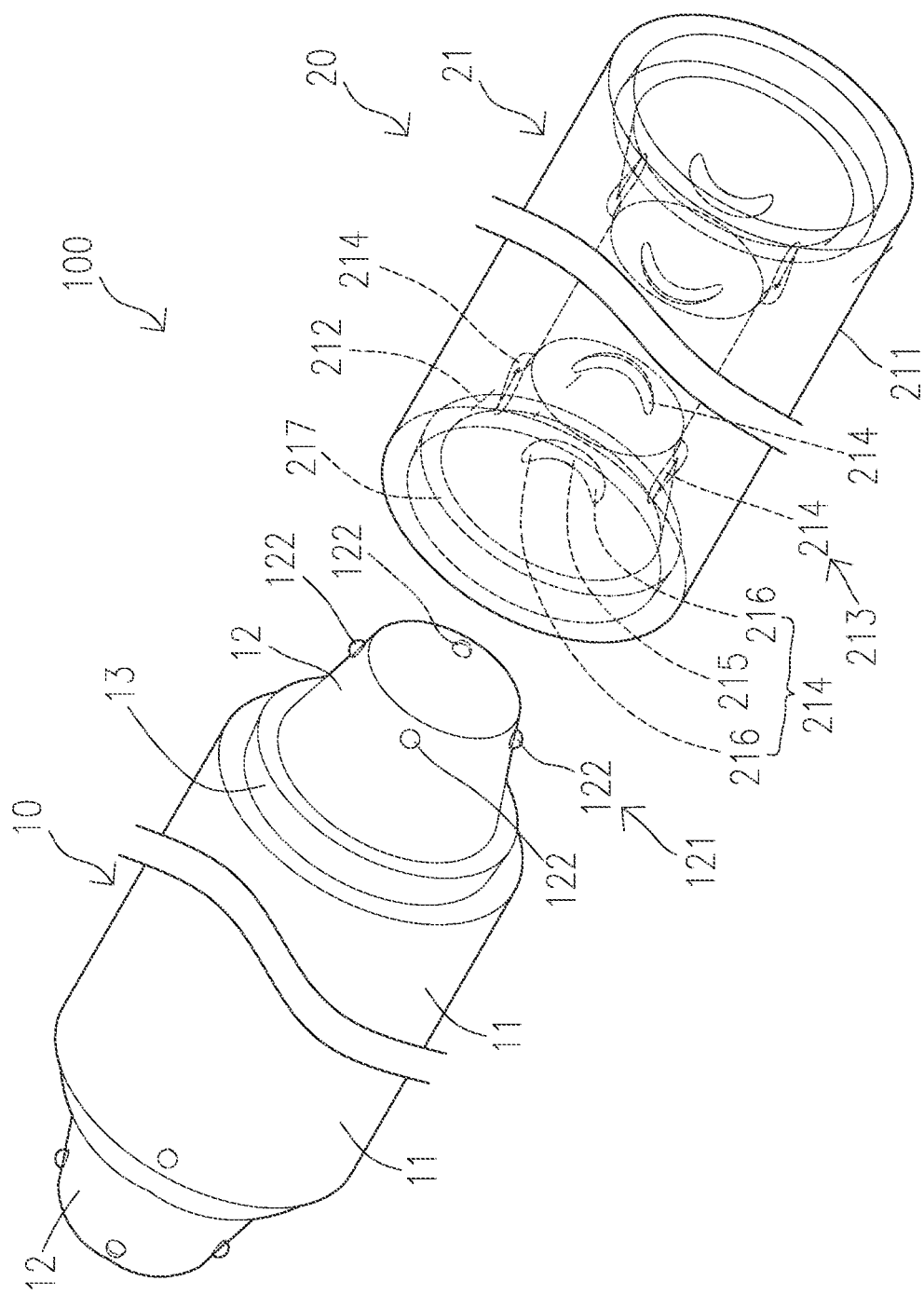
FIG. 1 is a perspective view, in a detached and partially see-through form, showing a preferred embodiment of the present invention.
Figure 2:
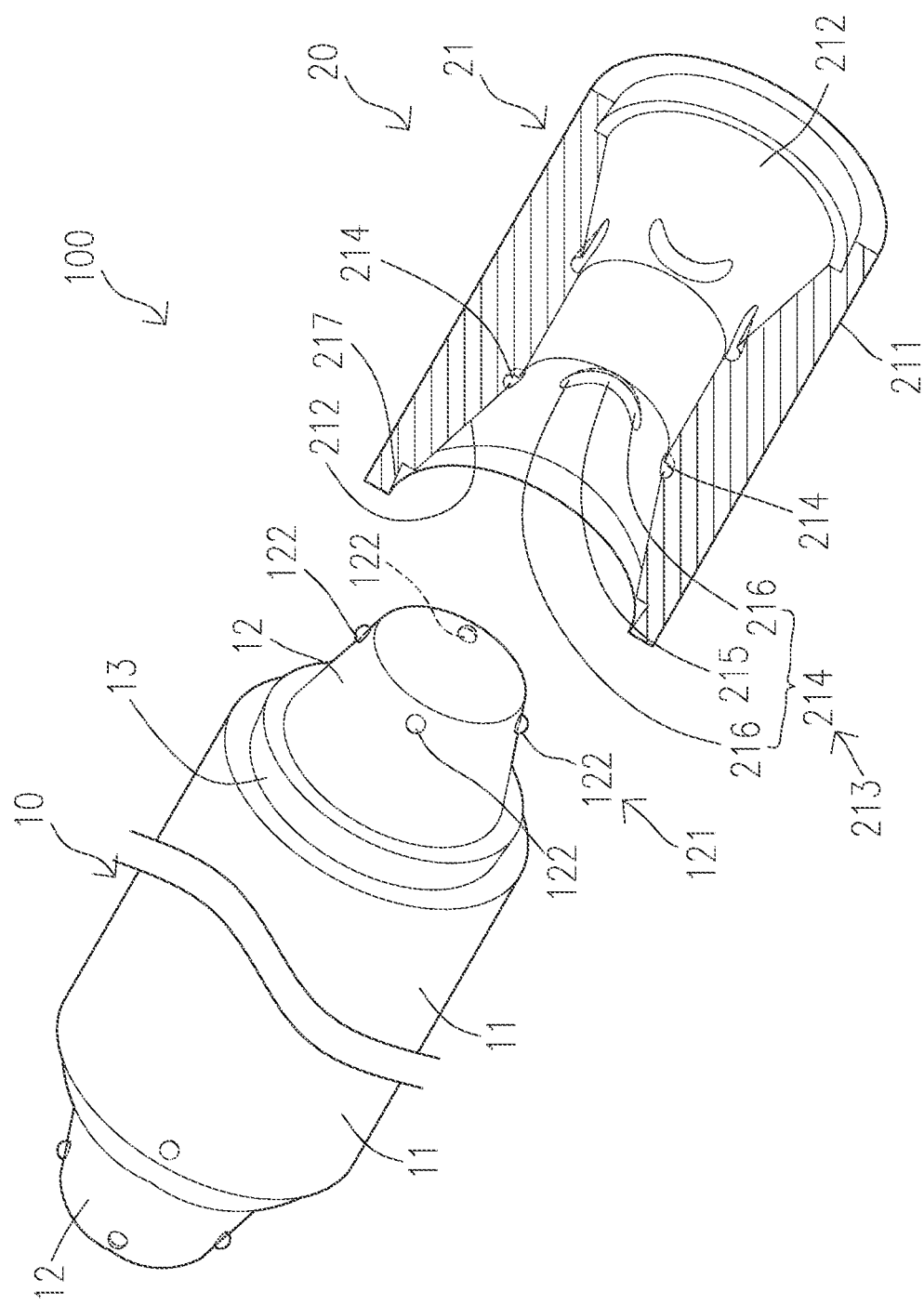
FIG. 2 is a perspective view, in a detached and partially sectioned form, showing the embodiment of FIG. 1.
Figure 3:
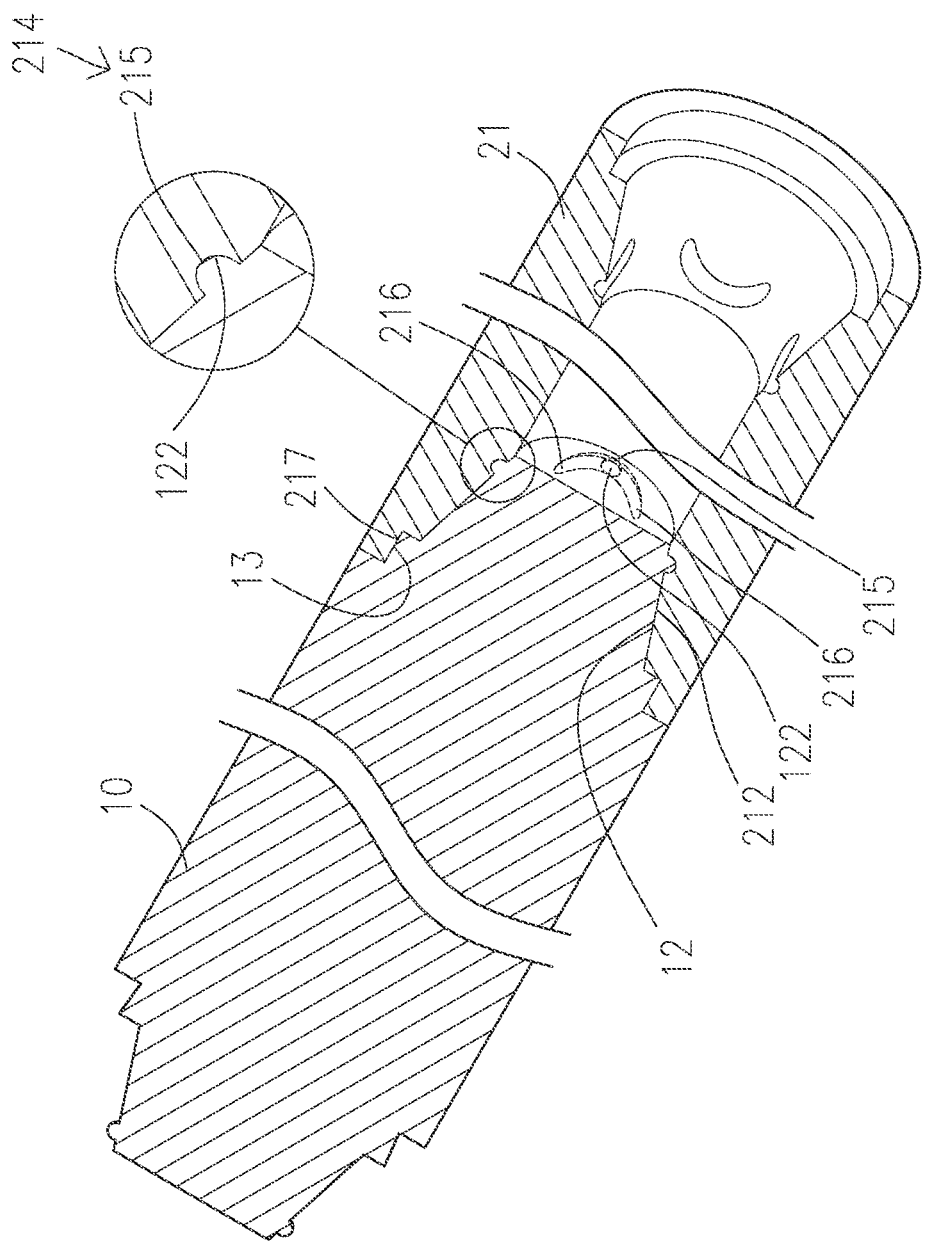
FIG. 3 is a cross-sectional view showing the embodiment of FIG. 1 in an assembled form.

Referring to FIGS. 1-3, a preferred embodiment of the present invention provides an insert-and-twist building block structure 100, which generally comprises at least one connection bar 10 and a connection terminal unit 20.

Referring to FIGS. 1-3, the connection bar 10 is made, as being integrally formed, of a plastic material that possesses a property of slightly elastic deformation. The connection bar 10 includes a grip section 11 and at least one combination projection section 12 extending outward in an axial direction from an end of the grip section 11. The combination projection section 12 is of a conic shape and has an outside diameter that is gradually increased from a distal end toward a proximal end of the combination projection section 12. A maximum outside diameter of the combination projection section 12 is smaller than an outside diameter of the grip section 11. The combination projection section 12 has an external circumferential surface is formed with at least one bead ring 121. The bead ring 121 includes multiple raised beads 122 that are arranged in a ring configuration in an intermittent form. The bead ring 121 is arranged on the external circumferential surface of the combination projection section 12 at a location adjacent to the distal end thereof. The connection bar 10 includes a tightening ring 13 that is arranged between the grip section 11 and the combination projection section 12, meaning the tightening ring 13 is set at a location corresponding to the proximal end of the combination projection section 12. The tightening ring 13 has an distal end having an outside diameter that is slightly greater than an outside diameter of a proximal end of the tightening ring 13. A maximum outside diameter of the tightening ring 13 is smaller than the outside diameter of the grip section 11 and is greater than the maximum outside diameter of the combination projection section 12.

Referring to FIGS. 1-3, the connection terminal unit 20 includes at least one connection terminal 21. The connection terminal 21 is made, as being integrally formed, of a plastic material that possesses a property of slightly elastic deformation. The connection terminal 21 includes a holding section 211 and at least one combination cavity 212 that is recessed inward in an axial direction from an end of the holding section 211. The combination cavity 212 is of a conic shape and has an inside diameter that is gradually decreased from an outer end toward an inner end of the combination cavity 212. The combination cavity 212 has an internal circumferential surface that is formed with at least one groove ring 213. The groove ring 213 is arranged on the internal circumferential surface of the combination cavity 212 that is adjacent to the inner end. The groove ring 213 includes multiple recessed grooves 214 that are arranged in a ring configuration in an intermittent form. The recessed grooves 214 are extended in a radial direction of the internal circumferential surface of the combination cavity 212 and are each formed as an elongate strip. Each of the recessed grooves 214 has a middle portion that forms a deep trough section 215 and two end portions each forming a shallow trough section 216. A groove depth of the recessed groove 214 is gradually decreased from the deep trough section 215 toward the shallow trough sections 216. The recessed grooves 214 are each of a crescent shape, meaning the two ends of the recessed groove 214 are curved in a direction toward the outer end of the combination cavity 212. The outer end of the combination cavity 212 is formed with a tightening groove 217. The tightening groove 217 has an inside diameter that is slightly smaller than the outside diameter of the distal end of the tightening ring 13 of the connection bar 10 and equal to the outside diameter of the proximal end of the tightening ring 13.

The above provides a description of each of the components/parts of the insert-and-twist building block structure 100 according to a preferred embodiment of the present invention, and in the following, a description of use and operation will be provided.

Figure 4:
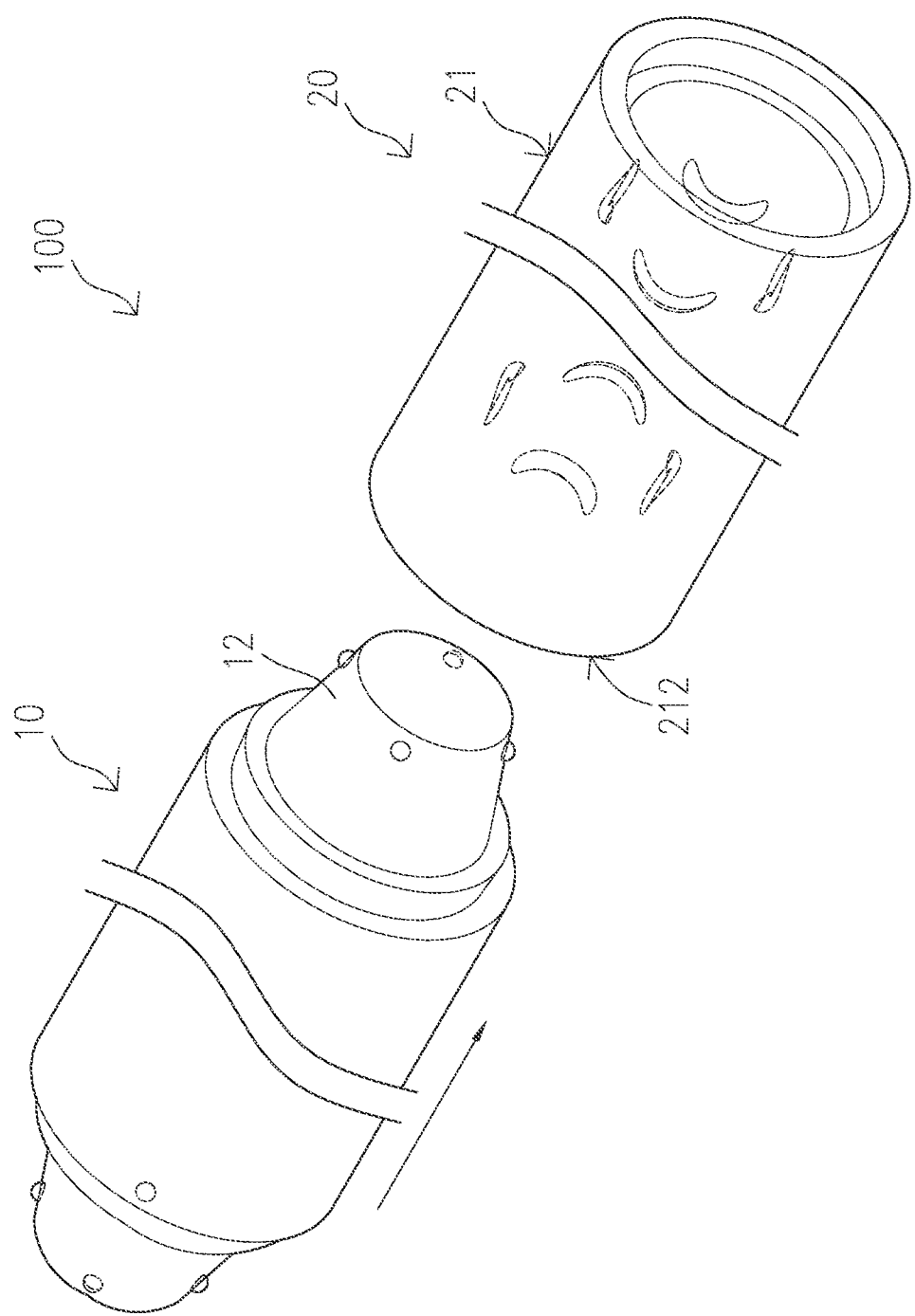
FIGS. 4-8 are schematic views showing an operation of the embodiment of FIG. 1.
Figure 5:
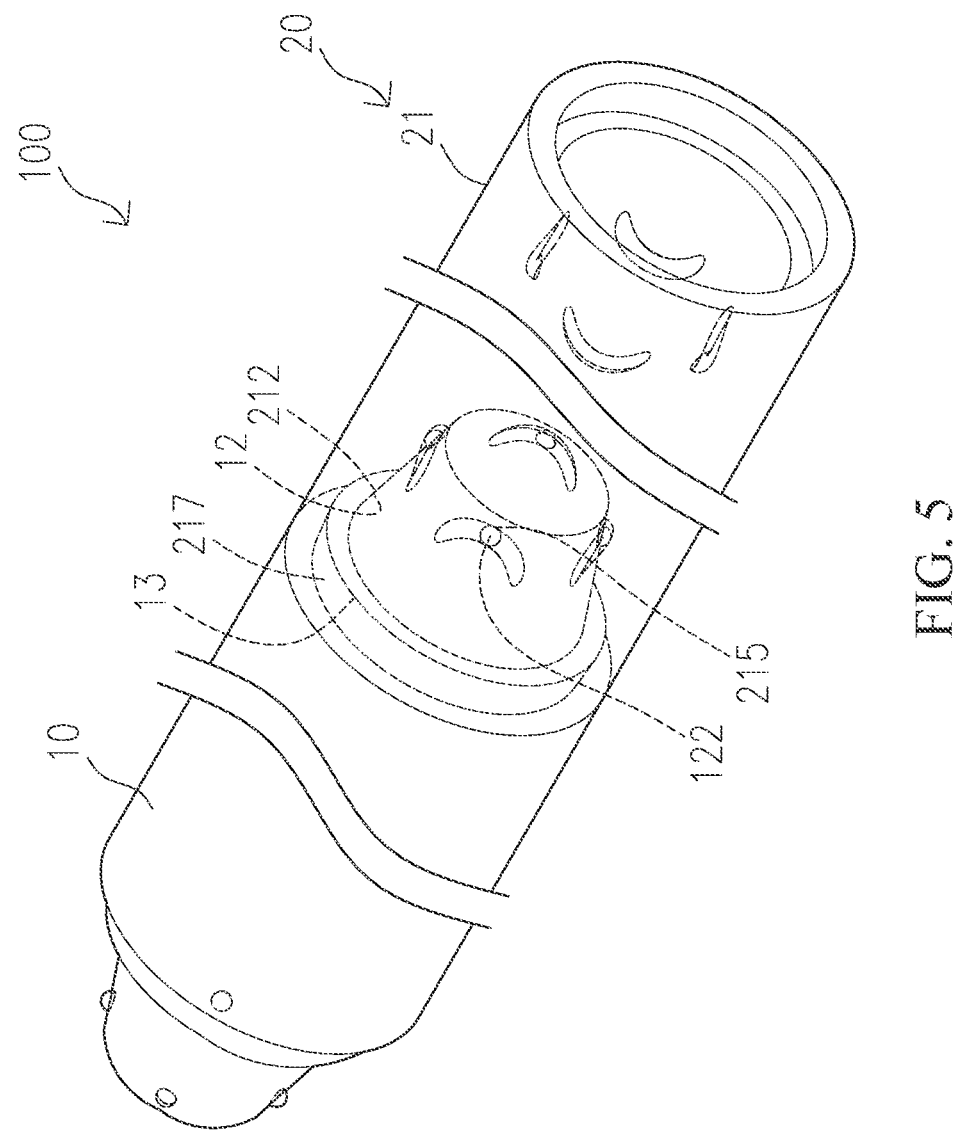

Firstly, referring to FIGS. 3-8, to combine a connection bar 10 and a connection terminal 21, the combination projection section 12 of the connection bar 10 is moved in a direction toward the combination cavity 212 of the connection terminal 21 (as shown in FIG. 4), so as to insert the combination projection section 12 into the combination cavity 212 and each of the raised beads 122 of the connection bar 10 is received in the deep trough section 215 of each of the recessed grooves 214 of the connection terminal 21 (as shown in FIGS. 3 and 5), and in this way, combination of the connection bar 10 and the connection terminal 21 is achieved. Further, during the insertion of the combination projection section 12 into the combination cavity 212, the tightening ring 13 of the connection bar 10 is slightly deformed as being forcibly fit into the tightening groove 217 of the connection terminal 21 (as shown in FIG. 3), so as to increase the strength of combination.

Figure 6:
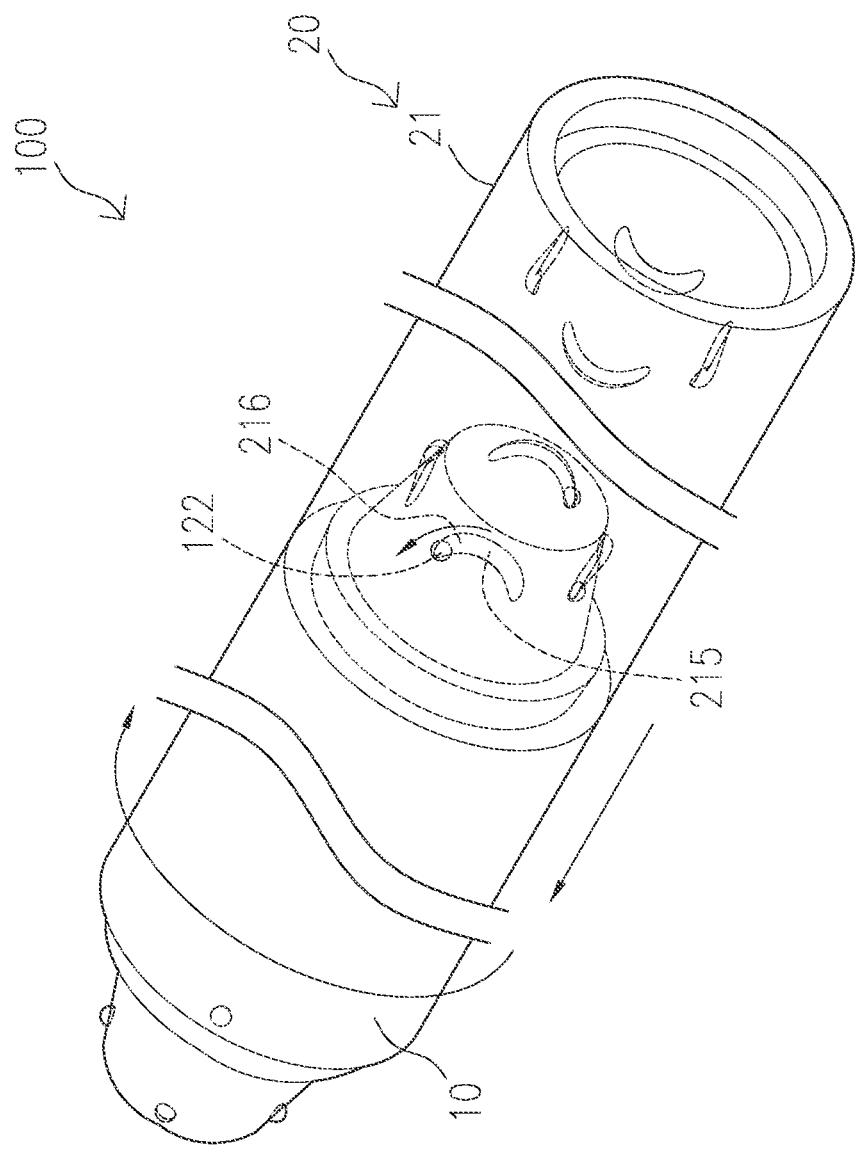
Figure 7:
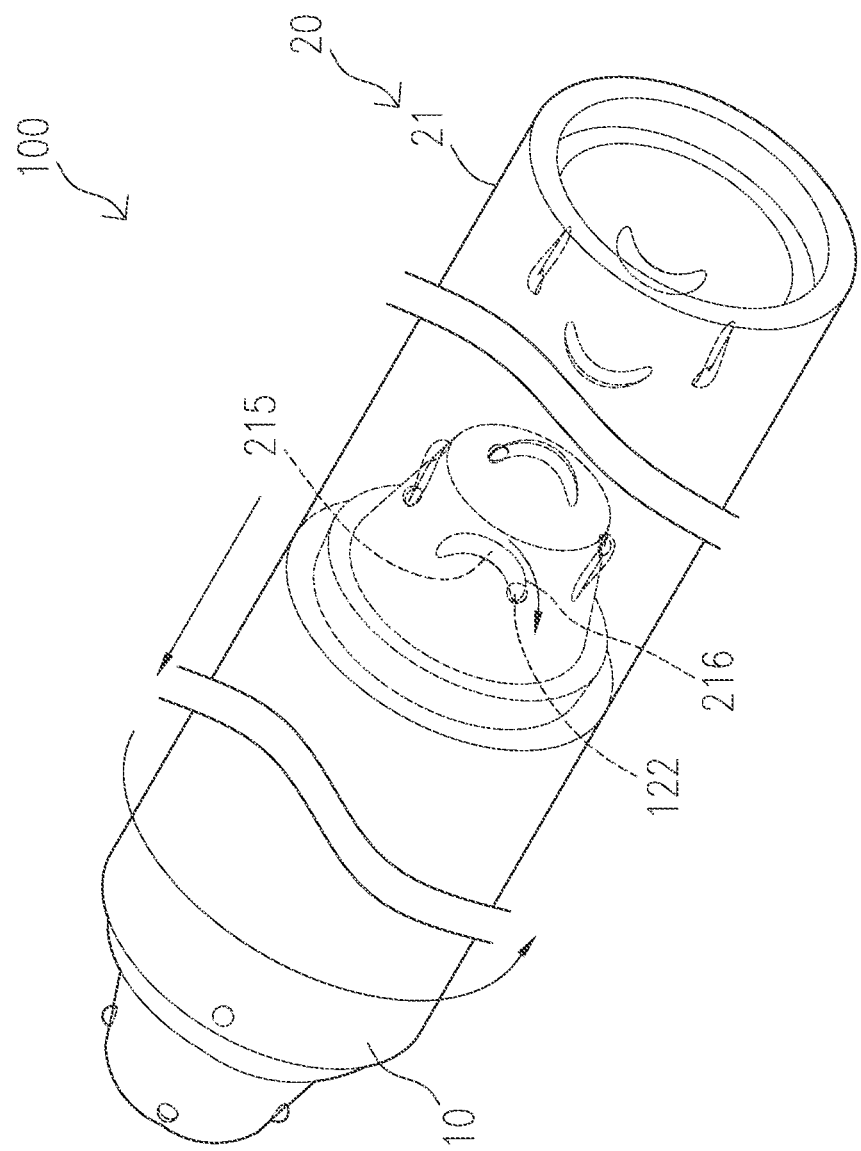
Figure 8:
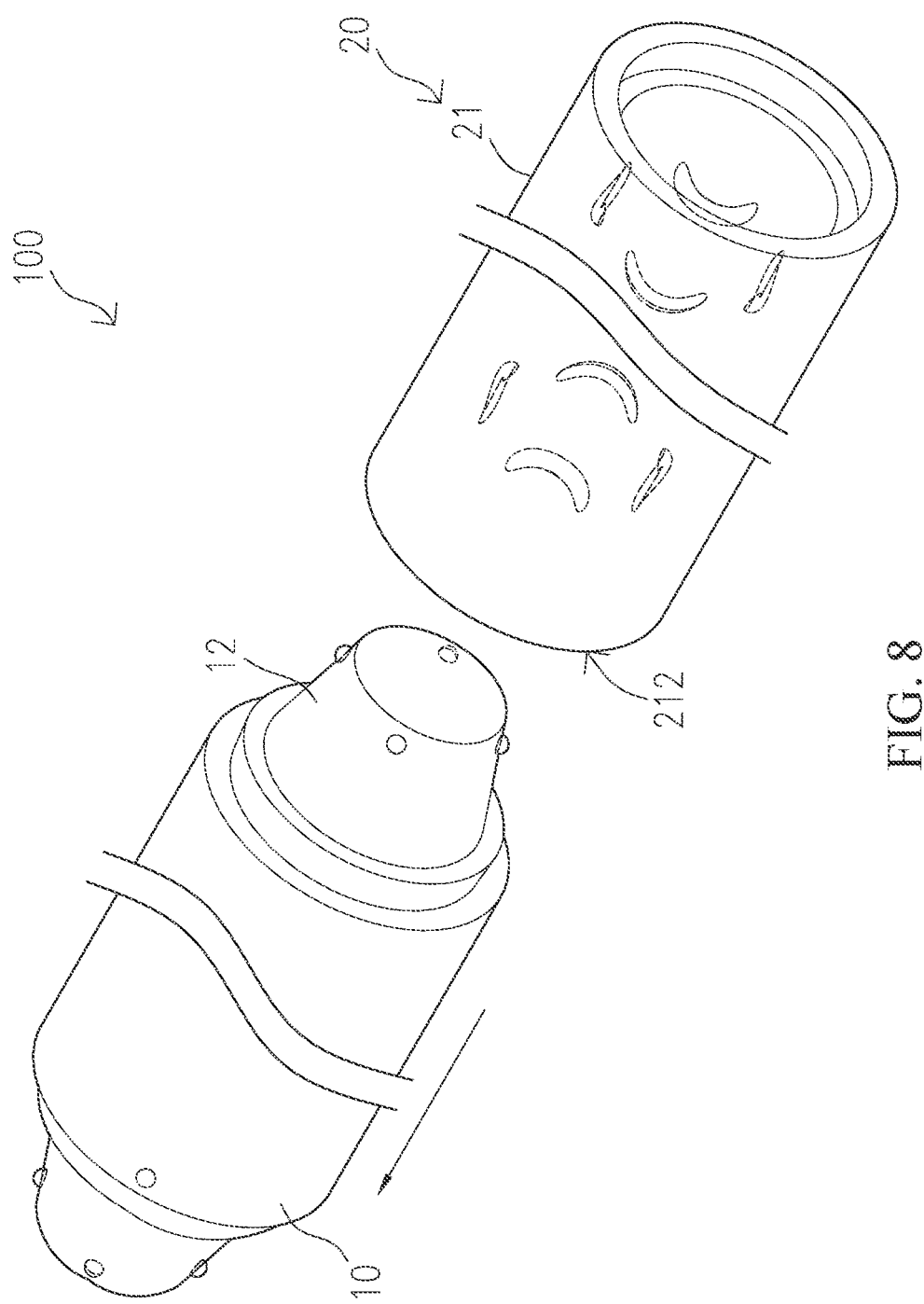

Next, to detach and separate the connection bar 10 and the connection terminal 21 that are combined together, one of the connection bar 10 and the connection terminal 21 is rotated, in either a clockwise direction or a counterclockwise direction (as shown in FIGS. 6 and 7), such that each of the raised beads 122 of the connection bar 10 is subjected to an action of rotation to move from the deep trough section 215 of the corresponding one of the recessed grooves 214 of the connection terminal 21 toward one of the shallow trough sections 216 and each of the raised beads 122 is acted upon by a slope from the deep trough section 215 to the shallow trough section 216 to smoothly and gently slide out of the recessed groove 214, whereby the connection bar 10 is detached from and separated from the connection terminal 21 (as shown in FIG. 8). Further, since the two ends of the recessed grooves 214 are made curving in a direction toward the outer end of the combination cavity 212 and show a crescent shape, when the raised beads 122 of the connection bar 10 are moved from the deep trough sections 215 toward the shallow trough sections 216, the connection bar 10 is also acted upon by the crescent shape of the recessed grooves 214 to move in a direction away from the connection terminal 21 in an axial direction so as to make the operation of detachment and separation smooth, gentle, and effortless.

Figure 9:
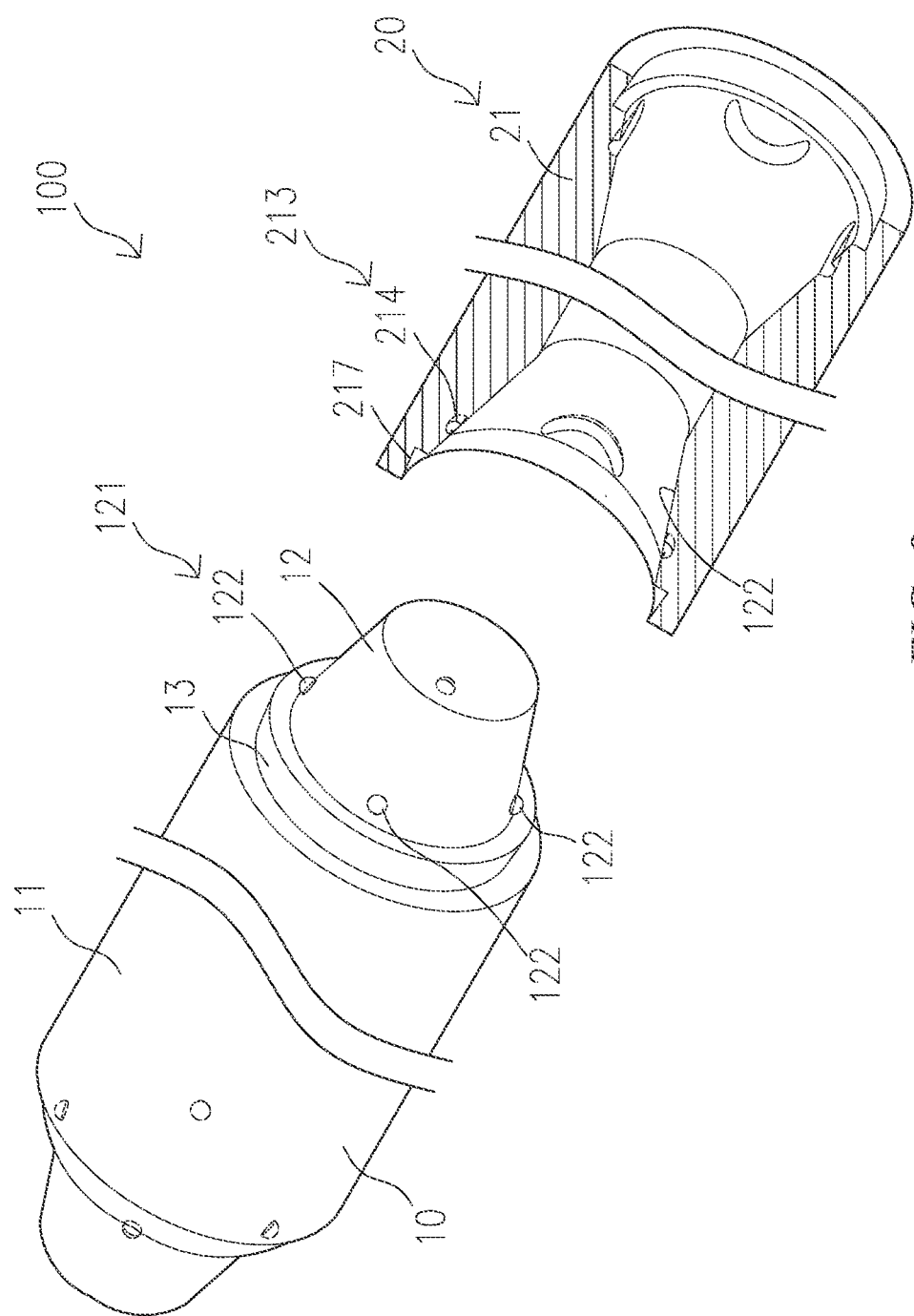
FIG. 9 is a perspective view, in a detached and partially sectioned form, showing another example of the embodiment of FIG. 1.

Further, although in the above embodiment, the bead ring 121 of the connection bar 10 is arranged on the external circumferential surface of the combination projection section 12 at a location adjacent to the distal end thereof and the groove ring 213 of the connection terminal 21 is arranged on the internal circumferential surface of the combination cavity 212 at a location adjacent to an inner end thereof, in an actual condition, as shown in FIG. 9, the bead ring 121 of the connection bar 10 may also be arranged on the external circumferential surface of the combination projection section 12 at a location adjacent to the proximal end thereof and the groove ring 213 of the connection terminal 21 is arranged on the internal circumferential surface of the combination cavity 212 at a location adjacent to the outer end thereof, this arrangement providing the same effect.

Figure 10:
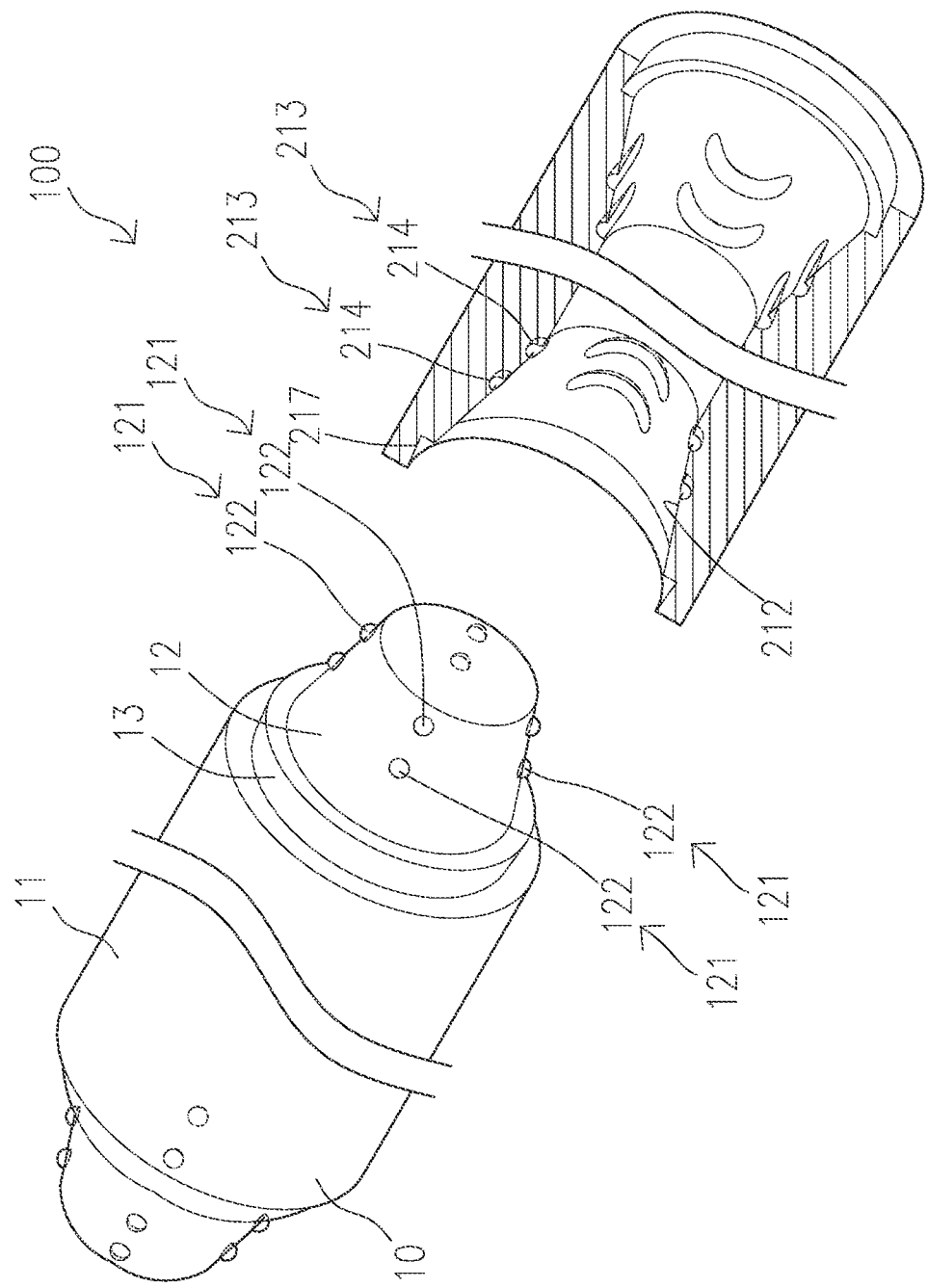
FIG. 10 is a perspective view, in a detached and partially sectioned form, showing a further example of the embodiment of FIG. 1.

Next, although in the above embodiment, the connection bar 10 includes one single bead ring 121 and the connection terminal 21 includes one single groove ring 213, in an actual condition, as shown in FIG. 10, the connection bar 10 may alternatively include two bead rings 121 and the connection terminal 21 includes two groove rings 213, this arrangement providing the same effect.

Figure 11:
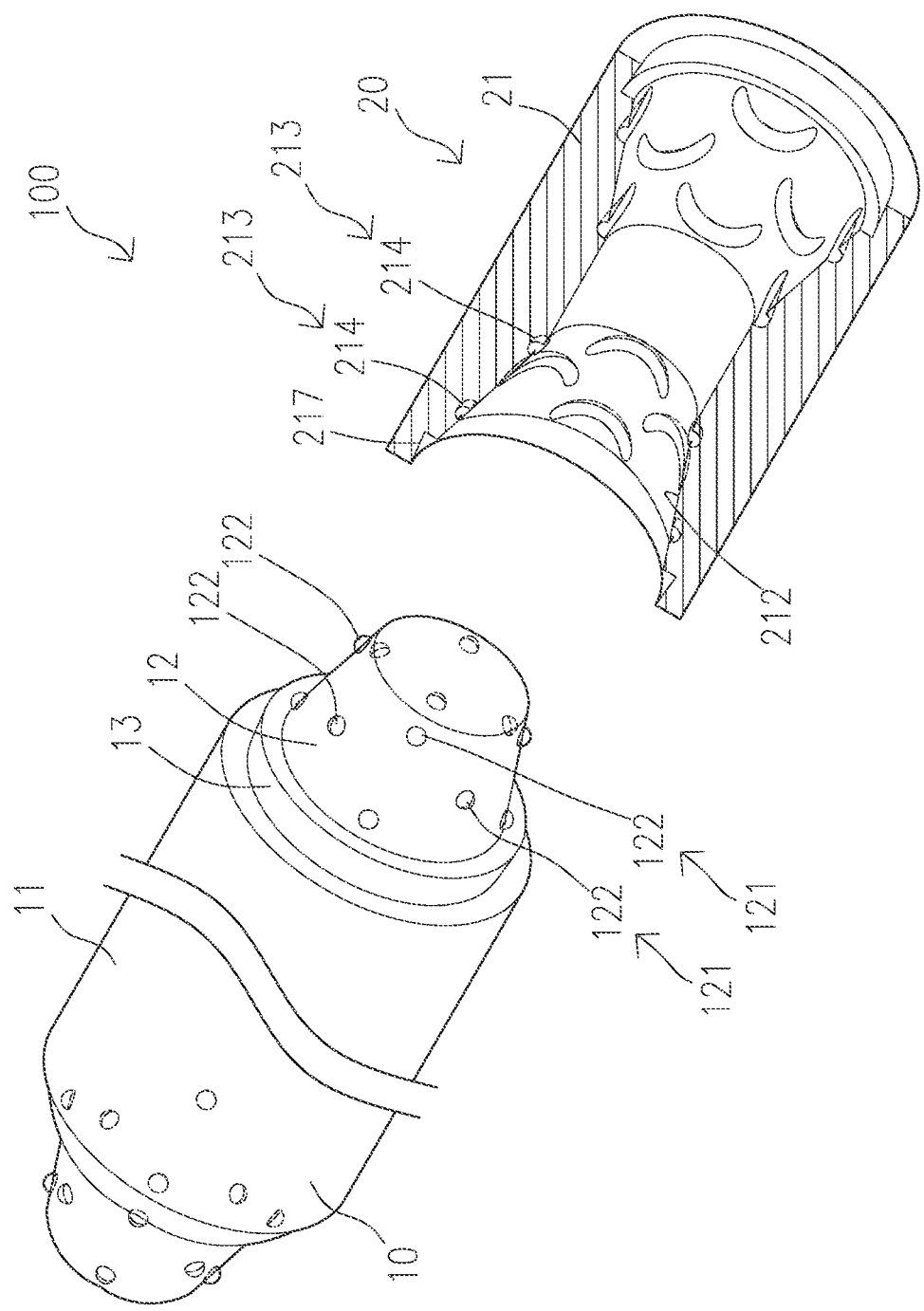
FIG. 11 is a perspective view, in a detached and partially sectioned form, showing yet a further example of the embodiment of FIG. 1.

Further, although in the above embodiment, the connection bar 10 includes one single bead ring 121 and the connection terminal 21 includes one single groove ring 213, in an actual condition, as shown in FIG. 11, the connection bar 10 may alternatively include two or more than two bead rings 121 and the connection terminal 21 includes two or more than two groove rings 213, and the raised beads 122 of adjacent ones of the bead rings 221 are alternate with each other in a staggered manner and the recessed grooves 214 of adjacent ones of the groove rings 213 are alternate with each other in a staggered manner, this arrangement providing the same effect.

Figure 12:
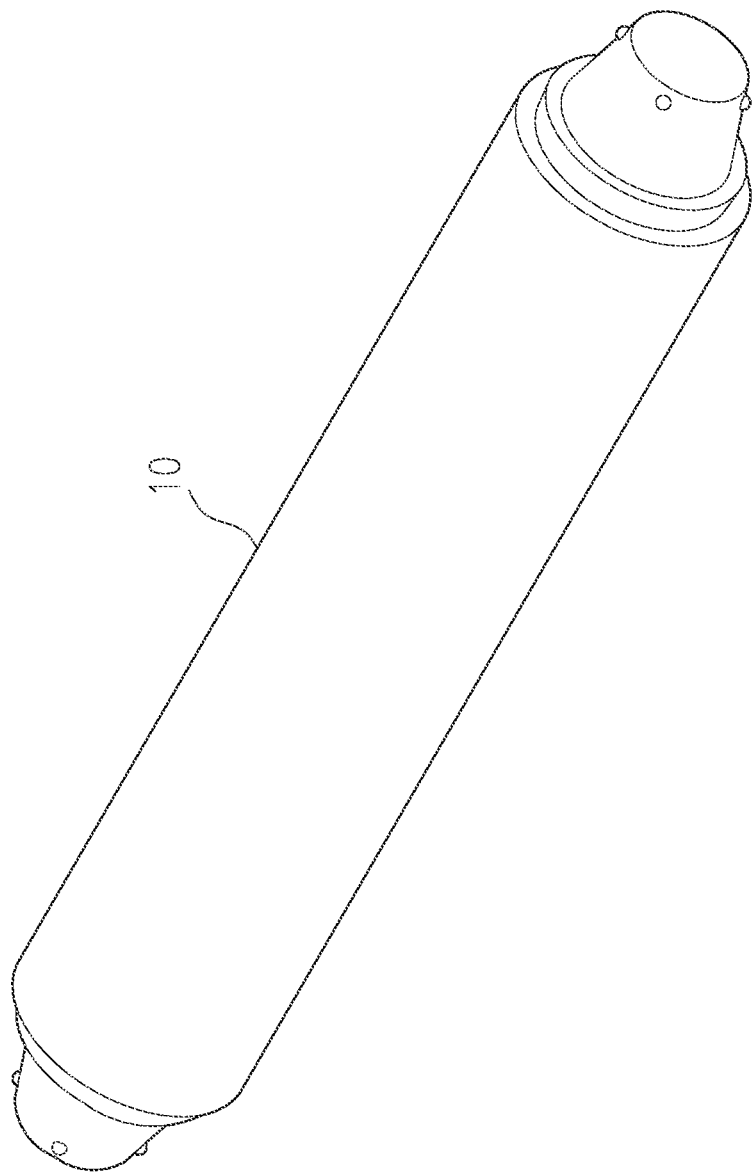
FIG. 12 is a perspective view showing an example of a connection bar according to the present invention.

Although in the above embodiment, the connection bar 10 is a short axial connection bar, in an actual condition, the connection bar 10 may alternatively be a long axial connection bar 10 (as shown in FIG. 12).

Figure 13:
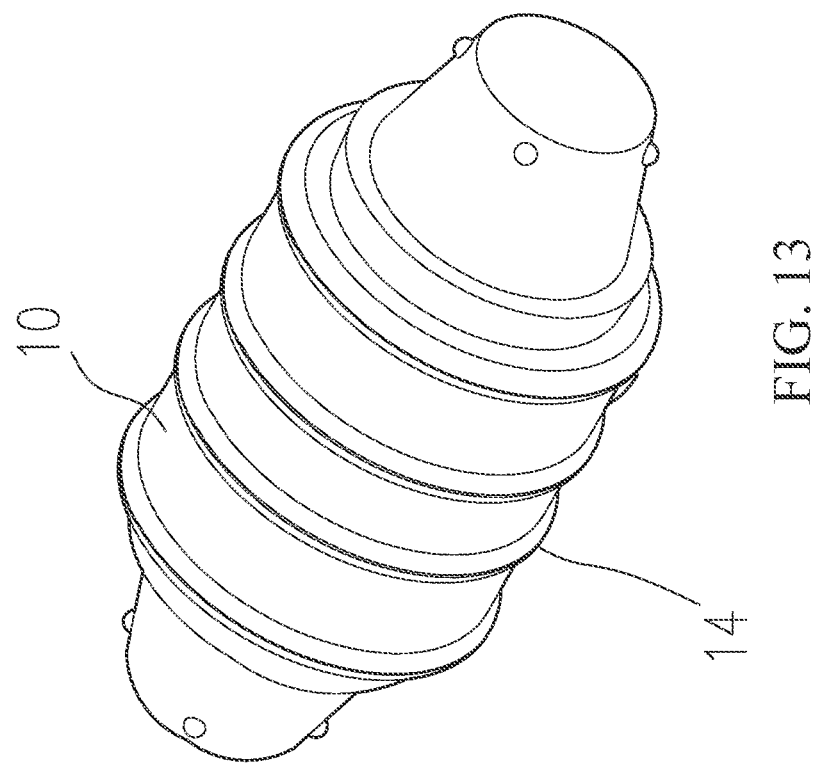
FIG. 13 is a perspective view showing another example of a connection bar according to the present invention.

In the above embodiment, as shown in FIG. 13, the connection bar 10 is a short axial connection bar, and the grip section 11 has an external circumferential surface on which an anti-skidding pattern 14 is provided, so that when it is used as a wheel axle, a frictional force can be increased for a rotation operation.

Figure 14:
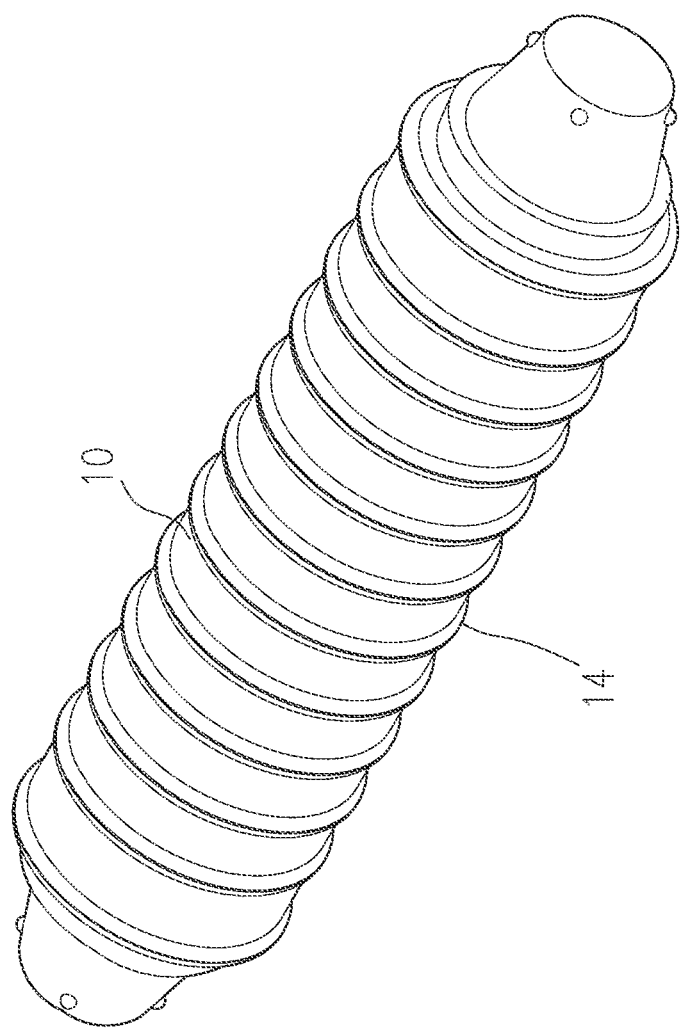
FIG. 14 is a perspective view showing a further example of a connection bar according to the present invention.

In the above embodiment, as shown in FIG. 14, the connection bar 10 is a long axial connection bar, and the grip section 11 has an external circumferential surface on which an anti-skidding pattern 14 is provided, so that when it is used as a wheel axle, a frictional force can be increased for a rotation operation.

Figure 15:
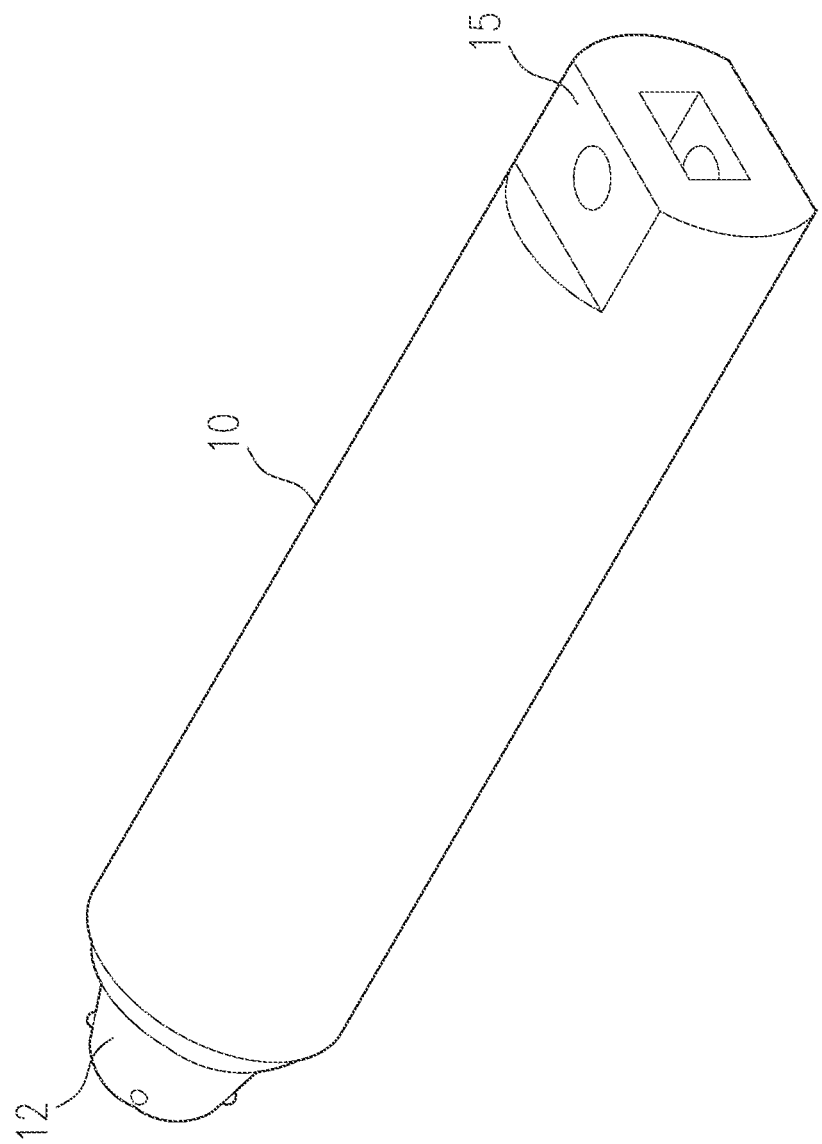
FIG. 15 is a perspective view showing yet a further example of a connection bar according to the present invention.
Figure 16A:
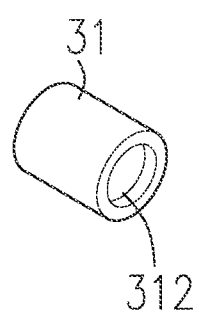
FIGS. 16a-16k are schematic views showing different examples of connection terminals according to the present invention.
Figure 16D:
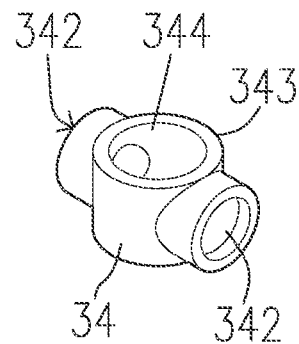
Figure 16B:
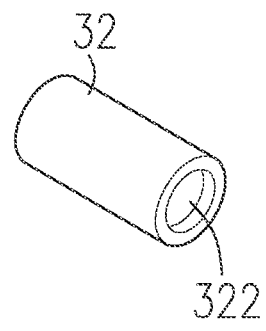
Figure 16E:
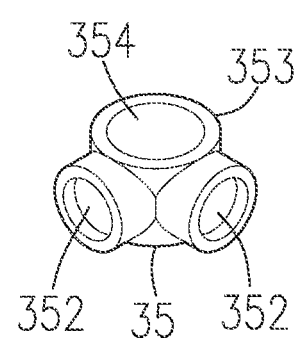
Figure 16C:
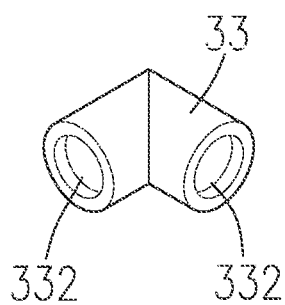
Figure 16F:
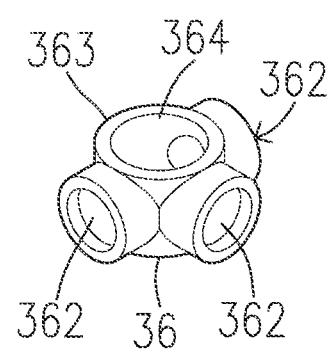
Figure 16G:
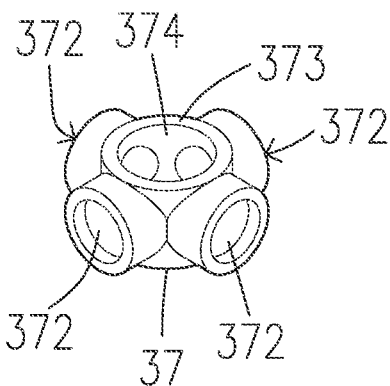
Figure 16J:
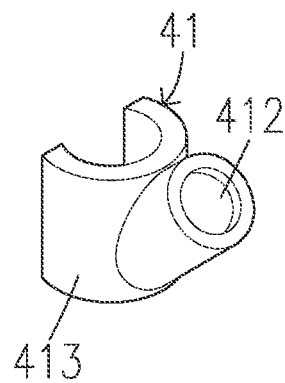
Figure 16H:
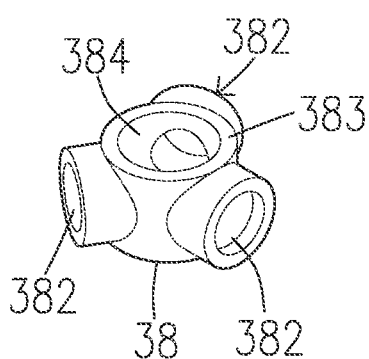
Figure 16K:
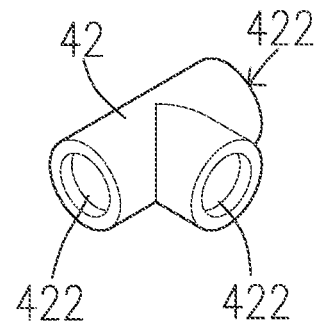
Figure 16I:
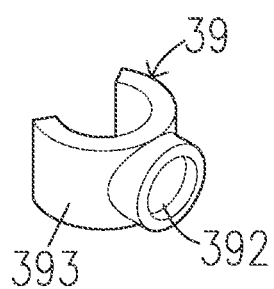

In the above embodiment, as shown in FIG. 15, the connection bar 10 has an end that is made in the form of a combination projection section 12, while an opposite end is formed as a motor coupling section 15 for coupling with a motor (not shown).

Referring to FIGS. 16a-16k, the connection terminal unit 20 may be constructed as various types of connection terminal, which may include one or multiple short coaxial double connection terminals 31, one or multiple long coaxial double connection terminals 32, one or multiple right-angled double connection terminals 33, one or multiple axial-tube-attached coaxial double connection terminals 34, one or multiple axial-tube-attached right-angled double connection terminals 35, one or multiple axial-tube-attached triple connection terminals 36, one or multiple axial-tube-attached cross-shaped quadruple connection terminals 37, one or multiple axial-tube-attached equiangular triple connection terminals 38, one or multiple right-angled C-clip single connection terminals 39, one or multiple inclined C-clip single connection terminals 41, and one or multiple T-shaped triple connection terminals 42.

The short coaxial double connection terminal 31 is a short axial tubular body that has an opening extending through two opposite ends thereof, and each of the ends is formed with a combination cavity 312, wherein each of the combination cavities 312 is provided therein with at least one groove ring (not shown) and the multiple recessed grooves (not shown) thereof.

The long coaxial double connection terminal 32 is long axial tubular body that has an opening extending through two opposite ends thereof, and each of the ends is formed with a combination cavity 322, wherein each of the combination cavities 322 is provided therein with at least one groove ring (not shown) and the multiple recessed grooves (not shown) thereof.

The right-angled double connection terminal 33 is formed of two tubular bodies connected to each other in a right-angled configuration, and the tubular bodies are each formed with a combination cavity 332, and each of the combination cavities 332 is provided therein with at least one groove ring (not shown) and the multiple recessed grooves (not shown) thereof.

The axial-tube-attached coaxial double connection terminal 34 is constructed as an axial tube 343 that is formed with a through hole 344 and has an outer circumferential surface that is formed with combination cavities 342 at locations that are opposite to each other, and each of the combination cavities 342 is provided therein with at least one groove ring (not shown) and the multiple recessed grooves (not shown) thereof.

The axial-tube-attached right-angled double connection terminal 35 is constructed as an axial tube 353 that is formed with a through hole 354 and has an outer circumferential surface that is formed with combination cavities 352 at locations that form a right angle, and each of the combination cavities 352 is provided therein with at least one groove ring (not shown) and the multiple recessed grooves (not shown) thereof.

The axial-tube-attached triple connection terminal 36 is constructed as an axial tube 363 that is formed with a through hole 364 and has an outer circumferential surface that is formed with three combination cavities 362, and each of the combination cavities 362 is provided therein with at least one groove ring (not shown) and the multiple recessed grooves (not shown) thereof.

The axial-tube-attached cross-shaped quadruple connection terminal 37 is constructed as an axial tube 373 that is formed with a through hole 374 and has an outer circumferential surface that is formed with four combination cavities 372, the combination cavities 372 being arranged to form a right angle with respect to one another, and each of the combination cavities 372 is provided therein with at least one groove ring (not shown) and the multiple recessed grooves (not shown) thereof.

The axial-tube-attached equiangular triple connection terminal 38 is constructed as an axial tube 383.

The right-angled C-clip single connection terminal 39 is constructed as a C-clip 393 that has a lateral side surface that is formed with a combination cavity 392, and the combination cavity 392 is provided therein with at least one groove ring (not shown) and the multiple recessed grooves (not shown) thereof, the C-clip 393 and the combination cavity 392 being arranged perpendicular to each other.

The inclined C-clip single connection terminal 41 is constructed as a C-clip 413 that has a lateral side surface that is formed with a combination cavity 412, and the combination cavity 412 is provided therein with at least one groove ring (not shown) and the multiple recessed grooves (not shown) thereof, the C-clip 413 and the combination cavity 412 being arranged inclined relative to each other.

The T-shaped triple connection terminal 42 has an outside surface that is formed with three combination cavities 422, and each of the combination cavities 422 is provided therein with at least one groove ring (not shown) and the multiple recessed grooves (not shown) thereof.

Figure 17:
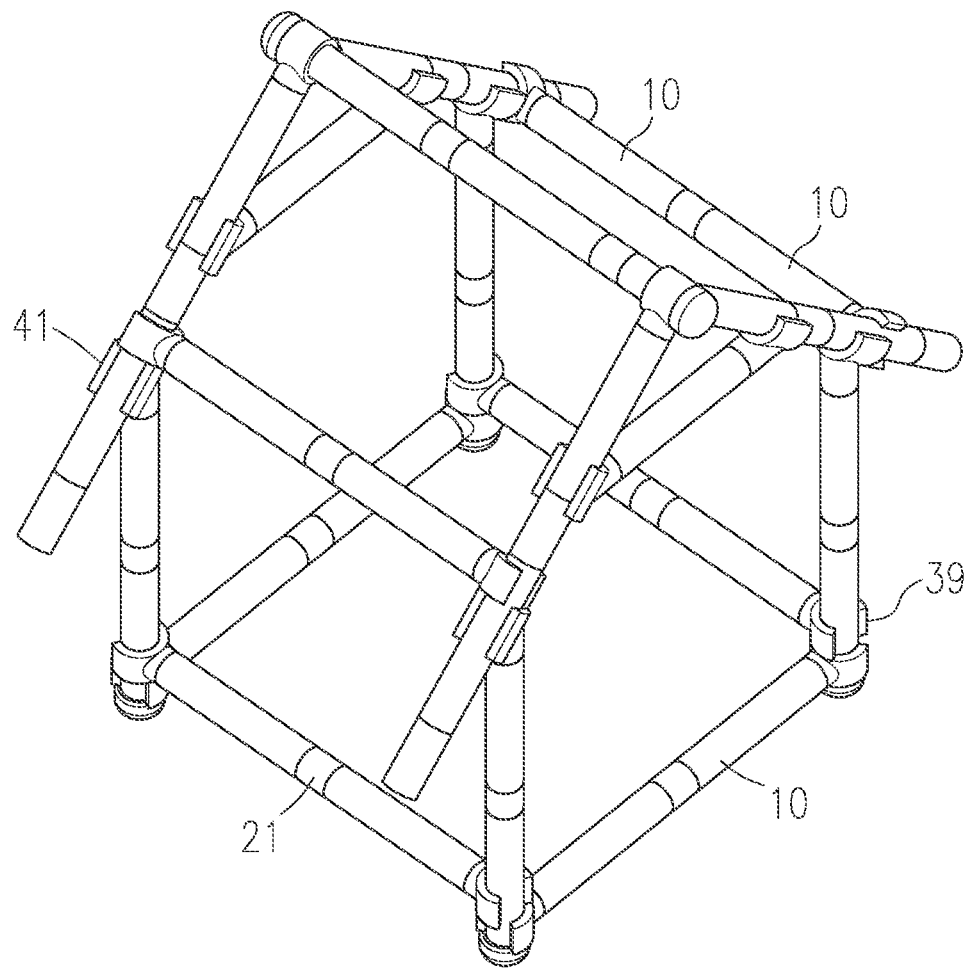
FIG. 17 is a perspective view showing a combined arrangement according to the present invention.
Figure 18:
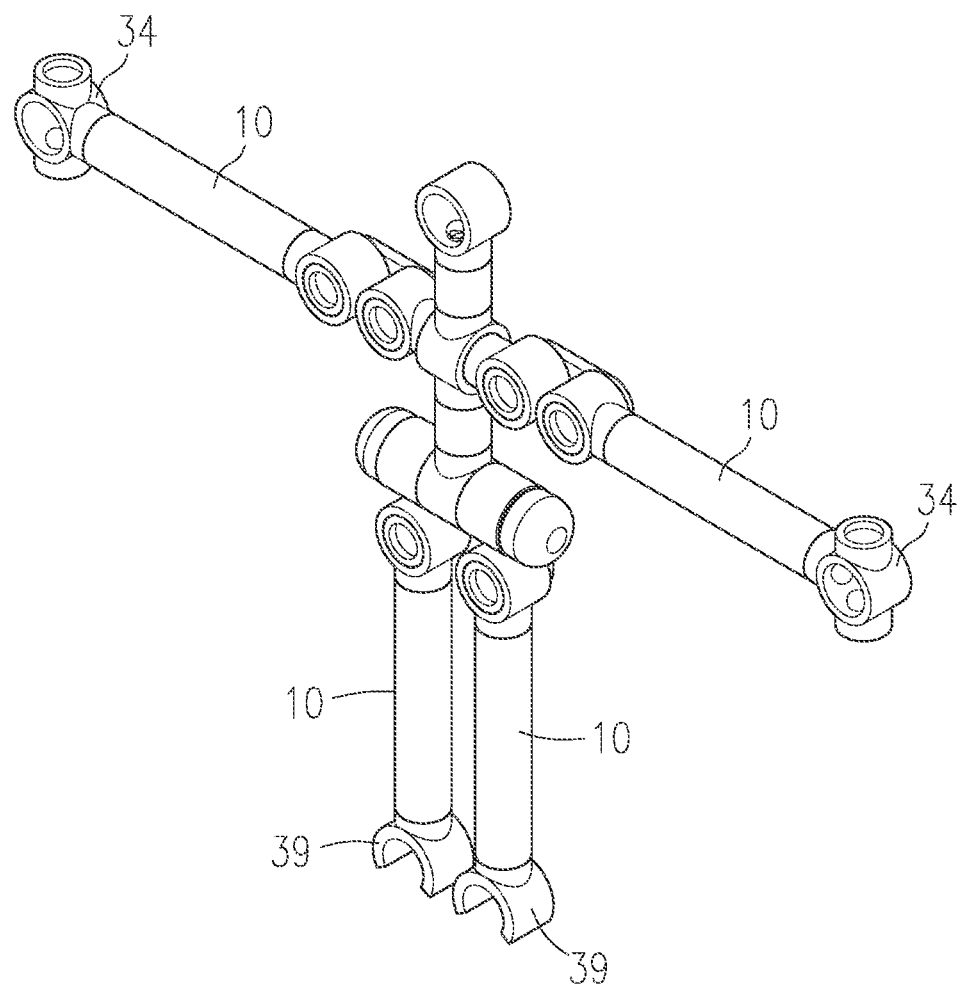
FIG. 18 is a perspective view showing another combined arrangement according to the present invention.

Each type of the connection terminal and the connection bar as described above is such that the combination cavity and the combination projection section have sizes that are corresponding to each other in order to be combinable with each other to form different combined arrangement (as shown in FIGS. 17 and 18), and this makes the combinations that the present invention may provide versatile and diversifying to help improve the creativity power of children.

I claim:

1. An insert-and-twist building block structure, comprising:
   at least one connection bar, the connection bar having at least one end from which a combination projection section extending outward in an axial direction, the combination projection section having an outside diameter that is increased from a distal end toward a proximal end so as to form a conic shape, the combination projection section having an external circumferential surface that is formed with at least one bead ring, the bead ring including multiple raised beads that are arranged in a ring configuration in an intermittent form; and
   a connection terminal unit, which comprises at least one connection terminal, the connection terminal having at least one end that is recessed inward in an axial direction to form a combination cavity, the combination cavity having an inside diameter that is decreased from an outer end toward an inner end so as to form a conic shape, the combination cavity having an internal circumferential surface that is formed with at least one groove ring, the groove ring including multiple recessed grooves that are arranged in a ring configuration in an intermittent form, the recessed grooves being extended in a radial direction of the internal circumferential surface of the combination cavity and being each formed as an elongate strip, each of the recessed grooves has a middle portion that forms a deep trough section and two end portions each forming a shallow trough section, the recessed grooves each having a depth that is decreased from the deep trough section toward the shallow trough section, the shallow trough sections of the two ends of the recessed grooves being curved in a direction toward the outer end of the combination cavity;

wherein the combination projection section of the connection bar is insertable into the combination cavity of the connection terminal to have the raised beads received in the deep trough sections of the recessed grooves to achieve combination; and the connection bar is rotatable to have the raised beads moved in a direction from the deep trough sections of the recessed grooves toward the shallow trough sections, so that the raised beads of the connection bar are acted upon by the curved configurations of the ends of the recessed grooves to cause the connection bar to move away from the connection terminal in an axial direction to separate the connection bar and the connection terminal from each other.

2. The insert-and-twist building block structure according to claim 1, wherein the connection bar is integrally formed and is of a plastic material that is elastically deformable; and the connection terminal is integrally formed and is of a plastic material that is elastically deformable.

3. The insert-and-twist building block structure according to claim 1, wherein the connection bar further comprises a grip section, the combination projection section being formed as extending outward from an end of the grip section in the axial direction, the maximum outside diameter of the combination projection section being smaller than an outside diameter of the grip section.

4. The insert-and-twist building block structure according to claim 3, wherein the grip section has an external circumferential surface that is formed with an anti-skidding pattern.

5. The insert-and-twist building block structure according to claim 1, wherein the bead ring of the connection bar is arranged on the external circumferential surface of the combination projection section at a location adjacent to the distal end; and the groove ring of the connection terminal is arranged on the internal circumferential surface of the combination cavity at a location adjacent to the inner end.

6. The insert-and-twist building block structure according to claim 1, wherein the bead ring of the connection bar is arranged on the external circumferential surface of the combination projection section at a location adjacent to the distal end; and the groove ring of the connection terminal is arranged on the internal circumferential surface of the combination cavity at a location adjacent to the outer end.

7. The insert-and-twist building block structure according to claim 1, wherein the connection bar comprises at least two bead rings, the connection terminal comprising at least two groove ring, the raised beads of adjacent ones of the bead rings being staggered with respect to each other, the recessed grooves of adjacent ones of the groove rings being staggered with respect to each other.

8. The insert-and-twist building block structure according to claim 1, wherein the connection bar has an opposite end that is formed with a motor coupling section, which is adapted to couple to a motor.

9. The insert-and-twist building block structure according to claim 1, wherein the connection terminal further comprises a holding section, the combination cavity being formed as being recessed from an end of the holding section in an axial direction.

10. The insert-and-twist building block structure according to claim 1, wherein the recessed grooves of the connection terminal are of a crescent shape.

11. The insert-and-twist building block structure according to claim 1, wherein the connection terminal unit further comprises one or multiple short coaxial double connection terminals and one or multiple long coaxial double connection terminals, wherein the short coaxial double connection terminal comprises a short axial tubular body having an opening penetrating through two opposite ends thereof, each of the two ends being formed with a combination cavity, each of the combination cavities being formed therein with at least one groove ring and the multiple recessed grooves thereof; and the long coaxial double connection terminal comprises a long axial tubular body having an opening penetrating through two opposite ends thereof, each of the two ends being formed with a combination cavity, each of the combination cavities being formed therein with at least one groove ring and the multiple recessed grooves thereof.

12. The insert-and-twist building block structure according to claim 1, wherein the connection terminal unit further comprises one or multiple right-angled double connection terminals and one or multiple T-shaped triple connection terminals, wherein the right-angled double connection terminal is formed of two tubular bodies connected to each other in a right-angled configuration, each of the tubular bodies being formed with a combination cavity, each of the combination cavities being formed therein with at least one groove ring and the multiple recessed grooves thereof; and the T-shaped triple connection terminal has an outside surface that is formed with three combination cavities, each of the combination cavities being formed therein with at least one groove ring and the multiple recessed grooves thereof.

13. The insert-and-twist building block structure according to claim 1, wherein the connection terminal unit further comprises one or multiple axial-tube-attached coaxial double connection terminals, one or multiple axial-tube-attached right-angled double connection terminals, one or multiple axial-tube-attached triple connection terminals, one or multiple axial-tube-attached cross-shaped quadruple connection terminals, and one or multiple axial-tube-attached equiangular triple connection terminals, wherein the axial-tube-attached coaxial double connection terminal comprises an axial tube that is formed with a through hole and has an outer circumferential surface that is formed with combination cavities at locations that are opposite to each other, each of the combination cavities being formed therein with at least one groove ring and the multiple recessed grooves thereof; the axial-tube-attached right-angled double connection terminal comprises an axial tube that is formed with a through hole and has an outer circumferential surface that is formed with combination cavities at locations that form a right angle, each of the combination cavities being formed therein with at least one groove ring and the multiple recessed grooves thereof; the axial-tube-attached triple connection terminal comprises an axial tube that is formed with a through hole and has an outer circumferential surface that is formed with three combination cavities, each of the combination cavities being formed therein with at least one groove ring and the multiple recessed grooves thereof; the axial-tube-attached cross-shaped quadruple connection terminal comprises an axial tube that is formed with a through hole and has an outer circumferential surface that is formed with four combination cavities, the combination cavities being arranged to form a right angle with respect to one another, each of the combination cavities being formed therein with at least one groove ring and the multiple recessed grooves thereof; and the axial-tube-attached equiangular triple connection terminal comprises an axial tube that is formed with a through hole and has an outer circumferential surface that is formed with three combination cavities, the combination cavities being arranged in an equiangular manner, each of the combination cavities being formed therein with at least one groove ring and the multiple recessed grooves thereof.

14. The insert-and-twist building block structure according to claim 1, wherein the connection terminal unit further comprises one or multiple right-angled C-clip single connection terminals and one or multiple inclined C-clip single connection terminals, wherein the right-angled C-clip single connection terminal comprises a C-clip having a lateral side surface that is formed with a combination cavity, the combination cavity being formed therein with at least one groove ring and the multiple recessed grooves thereof, the C-clip and the combination cavity being arranged perpendicular to each other; and the inclined C-clip single connection terminal comprises a C-clip having a lateral side surface that is formed with a combination cavity, the combination cavity being formed therein with at least one groove ring and the multiple recessed grooves thereof, the C-clip and the combination cavity being arranged inclined relative to each other.

15. An insert-and-twist building block structure, comprising:
at least one connection bar, the connection bar having at least one end from which a combination projection section extending outward in an axial direction, the combination projection section having an outside diameter that is increased from a distal end toward a proximal end so as to form a conic shape, the combination projection section having an external circumferential surface that is formed with at least one bead ring, the bead ring including multiple raised beads that are arranged in a ring configuration in an intermittent form; the connection bar comprising a tightening ring at the proximal end of the combination projection section, the tightening ring having a distal end having an outside diameter that is slightly greater than an outside diameter of a proximal end of the tightening ring, the tightening ring having a maximum outside diameter that is greater than a maximum outside diameter of the combination projection section; and
a connection terminal unit, which comprises at least one connection terminal, the connection terminal having at least one end that is recessed inward in an axial direction to form a combination cavity, the combination cavity having an inside diameter that is decreased from an outer end toward an inner end so as to form a conic shape, the combination cavity having an internal circumferential surface that is formed with at least one groove ring, the groove ring including multiple recessed grooves that are arranged in a ring configuration in an intermittent form, the recessed grooves being extended in a radial direction of the internal circumferential surface of the combination cavity and being each formed as an elongate strip, each of the recessed grooves has a middle portion that forms a deep trough section and two end portions each forming a shallow trough section, the recessed grooves each having a depth that is decreased from the deep trough section toward the shallow trough section;
the outer end of the combination cavity of the connection terminal being formed with a tightening groove, the tightening groove having an inside diameter that is smaller than the outside diameter of the distal end of the tightening ring and equal to the outside diameter of the proximal end of the tightening ring;
wherein the combination projection section of the connection bar is insertable into the combination cavity of the connection terminal to have the raised beads received in the deep trough sections of the recessed grooves to achieve combination; and the connection bar is rotatable to have the raised beads moved in a direction from the deep trough sections of the recessed grooves toward the shallow trough sections, so as to separate the connection bar and the connection terminal from each other; and
wherein when the combination projection section of the connection bar is inserted into the combination cavity of the connection terminal, the tightening ring is tightly fit in the tightening groove.

16. The insert-and-twist building block structure according to claim 15, wherein the connection bar is integrally formed and is of a plastic material that is elastically deformable; and the connection terminal is integrally formed and is of a plastic material that is elastically deformable.

17. The insert-and-twist building block structure according to claim 15, wherein the connection bar further comprises a grip section, the combination projection section being formed as extending outward from an end of the grip section in the axial direction, the maximum outside diameter of the combination projection section being smaller than an outside diameter of the grip section.

18. The insert-and-twist building block structure according to claim 17, wherein the grip section has an external circumferential surface that is formed with an anti-skidding pattern.

19. The insert-and-twist building block structure according to claim 15, wherein the bead ring of the connection bar is arranged on the external circumferential surface of the combination projection section at a location adjacent to the distal end; and the groove ring of the connection terminal is arranged on the internal circumferential surface of the combination cavity at a location adjacent to the inner end.

20. The insert-and-twist building block structure according to claim 15, wherein the bead ring of the connection bar is arranged on the external circumferential surface of the combination projection section at a location adjacent to the distal end; and the groove ring of the connection terminal is arranged on the internal circumferential surface of the combination cavity at a location adjacent to the outer end.

21. The insert-and-twist building block structure according to claim 15, wherein the connection bar comprises at least two bead rings, the connection terminal comprising at least two groove ring, the raised beads of adjacent ones of the bead rings being staggered with respect to each other, the recessed grooves of adjacent ones of the groove rings being staggered with respect to each other.

22. The insert-and-twist building block structure according to claim 15, wherein the connection bar has an opposite end that is formed with a motor coupling section, which is adapted to couple to a motor.

23. The insert-and-twist building block structure according to claim 15, wherein the connection terminal further comprises a holding section, the combination cavity being formed as being recessed from an end of the holding section in an axial direction.

24. The insert-and-twist building block structure according to claim 15, wherein the recessed grooves of the connection terminal are of a crescent shape.

25. The insert-and-twist building block structure according to claim 15, wherein the connection terminal unit further comprises one or multiple short coaxial double connection terminals and one or multiple long coaxial double connection terminals, wherein the short coaxial double connection terminal comprises a short axial tubular body having an opening penetrating through two opposite ends thereof, each of the two ends being formed with a combination cavity, each of the combination cavities being formed therein with at least one groove ring and the multiple recessed grooves thereof; and the long coaxial double connection terminal comprises a long axial tubular body having an opening penetrating through two opposite ends thereof, each of the two ends being formed with a combination cavity, each of the combination cavities being formed therein with at least one groove ring and the multiple recessed grooves thereof.

26. The insert-and-twist building block structure according to claim 15, wherein the connection terminal unit further comprises one or multiple right-angled double connection terminals and one or multiple T-shaped triple connection terminals, wherein the right-angled double connection terminal is formed of two tubular bodies connected to each other in a right-angled configuration, each of the tubular bodies being formed with a combination cavity, each of the combination cavities being formed therein with at least one groove ring and the multiple recessed grooves thereof; and the T-shaped triple connection terminal has an outside surface that is formed with three combination cavities, each of the combination cavities being formed therein with at least one groove ring and the multiple recessed grooves thereof.

27. The insert-and-twist building block structure according to claim 15, wherein the connection terminal unit further comprises one or multiple axial-tube-attached coaxial double connection terminals, one or multiple axial-tube-attached right-angled double connection terminals, one or multiple axial-tube-attached triple connection terminals, one or multiple axial-tube-attached cross-shaped quadruple connection terminals, and one or multiple axial-tube-attached equiangular triple connection terminals, wherein the axial-tube-attached coaxial double connection terminal comprises an axial tube that is formed with a through hole and has an outer circumferential surface that is formed with combination cavities at locations that are opposite to each other, each of the combination cavities being formed therein with at least one groove ring and the multiple recessed grooves thereof; the axial-tube-attached right-angled double connection terminal comprises an axial tube that is formed with a through hole and has an outer circumferential surface that is formed with combination cavities at locations that form a right angle, each of the combination cavities being formed therein with at least one groove ring and the multiple recessed grooves thereof; the axial-tube-attached triple connection terminal comprises an axial tube that is formed with a through hole and has an outer circumferential surface that is formed with three combination cavities, each of the combination cavities being formed therein with at least one groove ring and the multiple recessed grooves thereof; the axial-tube-attached cross-shaped quadruple connection terminal comprises an axial tube that is formed with a through hole and has an outer circumferential surface that is formed with four combination cavities, the combination cavities being arranged to form a right angle with respect to one another, each of the combination cavities being formed therein with at least one groove ring and the multiple recessed grooves thereof; and the axial-tube-attached equiangular triple connection terminal comprises an axial tube that is formed with a through hole and has an outer circumferential surface that is formed with three combination cavities, the combination cavities being arranged in an equiangular manner, each of the combination cavities being formed therein with at least one groove ring and the multiple recessed grooves thereof.

28. The insert-and-twist building block structure according to claim 15, wherein the connection terminal unit further comprises one or multiple right-angled C-clip single connection terminals and one or multiple inclined C-clip single connection terminals, wherein the right-angled C-clip single connection terminal comprises a C-clip having a lateral side surface that is formed with a combination cavity, the combination cavity being formed therein with at least one groove ring and the multiple recessed grooves thereof, the C-clip and the combination cavity being arranged perpendicular to each other; and the inclined C-clip single connection terminal comprises a C-clip having a lateral side surface that is formed with a combination cavity, the combination cavity being formed therein with at least one groove ring and the multiple recessed grooves thereof, the C-clip and the combination cavity being arranged inclined relative to each other.

\* \* \* \* \*